United States Patent [19]

Dimitrik

[11] 3,844,741

[45] Oct. 29, 1974

[54] AIR PURIFIER

[76] Inventor: Paul Dimitrik, 433 Ridge Crest, Richardson, Tex. 75080

[22] Filed: Oct. 11, 1972

[21] Appl. No.: 296,572

[52] U.S. Cl. ............... 55/102, 21/74 A, 21/DIG. 2, 55/126, 55/130, 55/138, 55/139, 55/146, 55/151, 55/155, 55/279, 55/316, 55/387, 55/467, 250/532, 250/431, 250/504
[51] Int. Cl. .......... B03c 3/04, B03c 3/41, B03c 3/47
[58] Field of Search ............. 55/102, 124, 126, 128, 55/129, 130, 139, 146, 150, 151, 279, 387, 138, 136, 155, 467; 21/74 A, DIG. 2; 250/539, 532, 431, 428, 432, 435, 437, 438, 504

[56] References Cited
UNITED STATES PATENTS

| | | | |
|---|---|---|---|
| 2,231,330 | 2/1941 | Gove | 55/151 |
| 2,244,279 | 6/1941 | White | 55/150 UX |
| 2,974,747 | 3/1961 | Coolidge, Jr. et al. | 55/124 |
| 3,191,362 | 6/1965 | Bourgeois | 55/126 |
| 3,237,068 | 2/1966 | Sowiak | 317/262 |
| 3,421,291 | 1/1969 | Messen-Jaschin | 55/151 X |
| 3,438,180 | 4/1969 | Klouda | 339/278 X |
| 3,744,217 | 7/1973 | Ebert | 98/115 K X |
| 3,745,750 | 7/1973 | Arff | 21/74 A X |
| 3,747,300 | 7/1973 | Knudson | 55/156 X |

*Primary Examiner*—Dennis E. Talbert, Jr.
*Attorney, Agent, or Firm*—Warren H. Kintzinger

[57] ABSTRACT

An air purifier having an electrostatic precipitator for removing particles from the air, an ultraviolet light for treating the air, and an ozone removing filter positioned downstream from the precipitator. A filter including a metallic screen positioned upstream of the precipitator. The precipitator including a helical wound wire forming loops with an electrical power source connected directly to each of the loops. A power source for the electrostatic precipitator adapted to be battery operated for use in an automobile.

8 Claims, 4 Drawing Figures

AIR PURIFIER

BACKGROUND OF THE INVENTION

Generally, it is old to utilize an electrostatic precipitator in combination with an air filter for purifying air. However, today with the increase in air pollution, it is desirable to have air purifiers which are more efficient as well as having an improved performance for removing dust particles, odors, germs and other air pollutants from the air.

The present invention is useful in providing an improved air purifier which is particularly useful in offices, hospitals, homes and vehicles.

SUMMARY

The air purifier of the present invention is generally directed to providing three stages of air purification utilizing an electrostatic unit, ultraviolet light, and a filter.

The air purifier of the present invention is directed to providing electrostatic unit for removing particles from the air with the ultraviolet light treating bacteria and germs, and an activated charcoal filter for removing the ozone created by the electrostatic unit as well as filtering other matter from the air.

A further object of the present invention is the provision of an air purifier having an improved electrostatic precipitator in which one of the precipitator elements includes a helical wound wire forming a plurality of loops in which electrical power is connected directly to each of the loops to provide power to the loops individually even in the event that one of the other loops breaks or burns out. In addition, the support for the helical coil may form a baffle plate through the center of the coil to provide a serpentine passageway through the precipitator thereby having a longer air treatment path in a small area.

Yet a further object is the provision of a filter at the air intake of the purifier having a metallic screen for removing oily substances from the air before it reaches the precipitator.

Yet a further object of the present invention is the provision of a power source for operating an electrostatic precipitator of the present air filter from a vehicle battery including switching means adapted to be connected to the battery with a free running multivibrator connected to and actuating the switching means for producing the desired voltage frequency, and coil means for stepping up the pulsating dc voltage for application to the precipitator elements.

Other and further objects and advantages will be apparent from the following description of the preferred embodiments of the present invention.

DESCRIPTION OF THE PREFERRED EMBODIMENT

Figure 1:
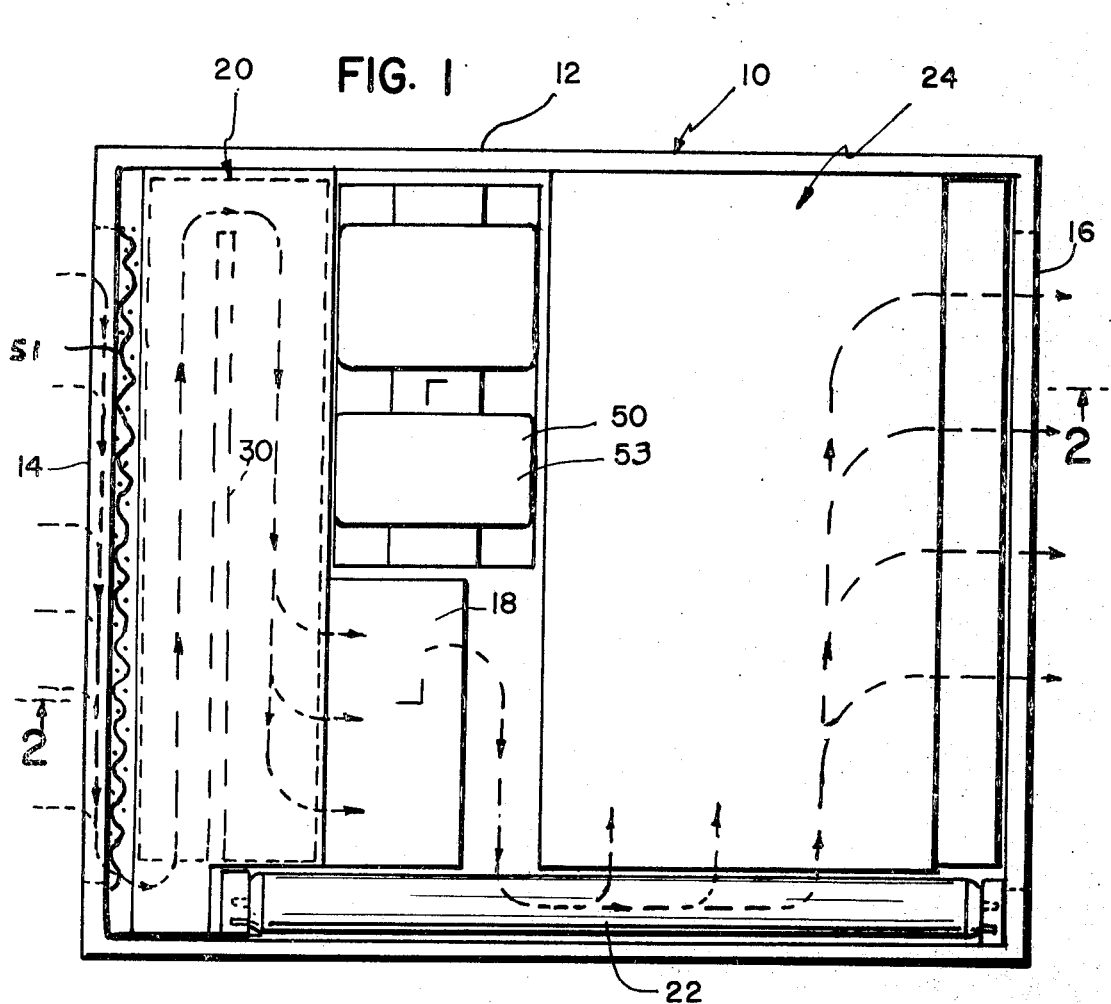
FIG. 1 is an elevational view, partly in cross section of the present invention.

Referring now to the drawings, the reference numeral 10 generally indicates the air purifier of the present invention and includes a housing 12 having an air inlet 14 and an air outlet 16. While, of course, the air may be caused to flow through the housing 12 between the inlet 14 and the outlet 16 by any suitable means such as connecting the apparatus 10 in tandem with an air conditioning unit, a fan 18 may be provided in the housing 12 for conducting air therethrough.

The air filter 10 generally includes an electrostatic precipitator unit generally indicated by the reference numeral 20 for electrically charging and removing particles from the air, an ultraviolet light 22 for killing germs and bacteria in the air, and a filter generally indicated by the reference numeral 24.

Figure 3:
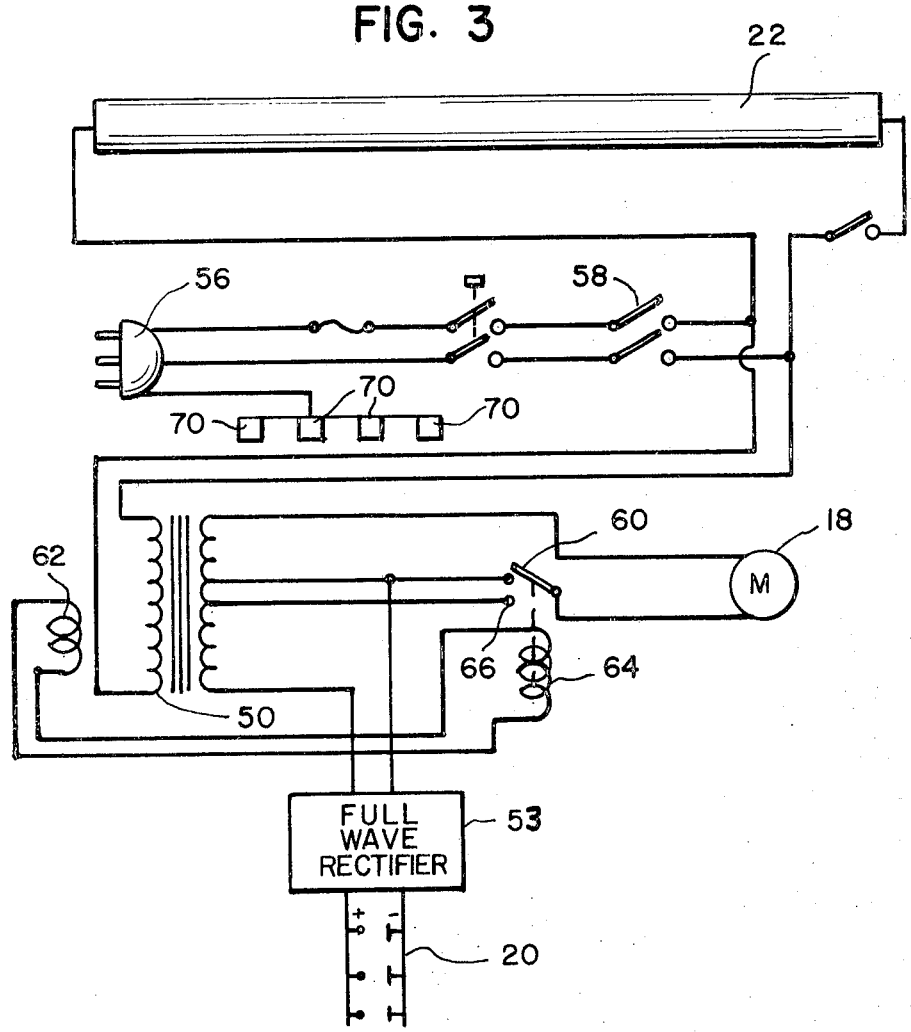
FIG. 3 is one form of electrical schematic of the power and control system of the present invention.

The electrostatic precipitator 20 preferably includes as one element therein a modified straight wire section helical wound wire 26 forming a plurality of spaced individually electrically connected loops about a support 28 consisting of a vertical member 30 and horizontal members 32 and 34 made of a high dielectric and flame resistant material. The second element of the electrostatic precipitator may include a plurality of aluminum plates, aluminum foil, or electroplated elements, 36, 38, 40 and 42. It is to be noted that the vertical member 30 provides a barrier through the straight wire section modified helical coil 26 thereby requiring the air flow, as indicated by dotted arrows in FIG. 1, to flow in the air inlet 14 up one side of the member 30 around the end of member 30, and down the second side of the member 30 by straight wire loop sections positioned in a serpentine passageway for providing a compact precipitator with a long air treating path. Preferably, one or more electrical supply conductors 44 and 46 may be mounted running longitudinally along one of the support members, such as 32, and interconnected to each of the individual parallel loops of the helical wound coil 26 to provide an electrical connection to each of the loops so that in the event that one of the loops burns out or breaks the remaining loops will continue to operate and precipitate particles from the air flowing therethrough. By way of example only, the electrostatic precipitator may be supplied with a voltage of 6,000 volts from a transformer 50 through a full wave rectifier 53 (FIGS. 1 and 3). The helical wound coil 26 may be of 32 gauge wire with the loops spaced a distance apart not exceeding ¾ of an inch and with the aluminum conductors 44 and 46 being of strips of aluminum .005 of an inch thick.

The ultraviolet light 22 in one embodiment which was found to be satisfactory was a conventional ultraviolet light of 8 watts.

While the electrostatic precipitator 20 performs the desirable function of removing particles from the air, the precipitator also creates ozone which has the undesirable property of drying out human respiratory membranes. Therefore, one of the functions of the filter 24 is to remove the ozone from the treated air. Thus the filter 24 is positioned downstream from the precipitator 20. In addition to removing ozone, it is desirable that the filter 24 also additionally filter the air. One particular type of filter 24 which has been found to be particularly desirable is the use of a plurality of filter elements 52 having an outer case 54 including activated coconut charcoal particles for removing the ozone and other undesirables from the air.

Preferably, a filter element 51 is positioned in the airstream at the inlet 14 which includes a metallic mesh such as stainless steel which has the property of condensing any fatty, waxy or oily substances out of the air and onto the cool metal mesh. The filter 51 will assist in preventing the electrostatic precipitator 20 from being coated up and becoming less effective.

Figure 2:
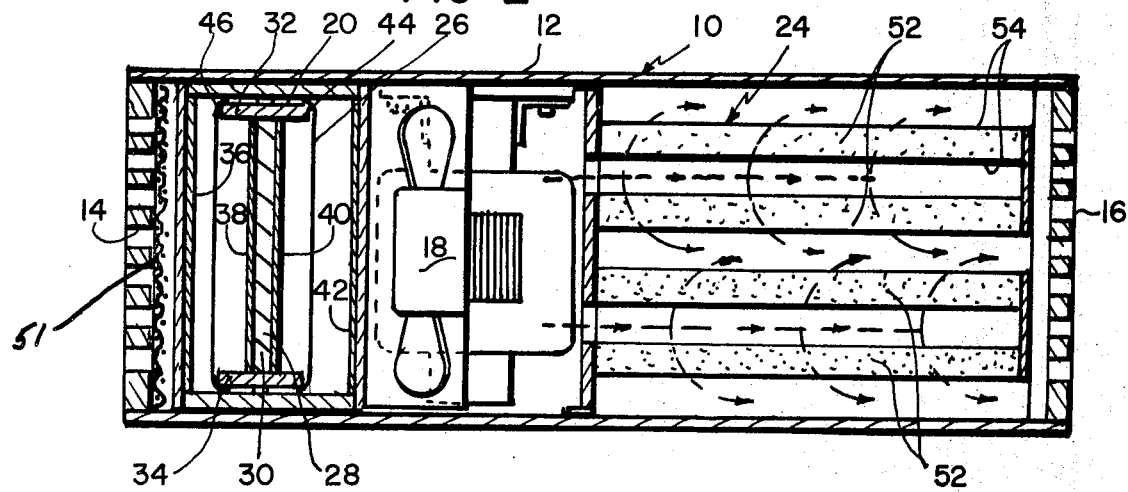
FIG. 2 is a cross-sectional view taken along the line 2—2 of FIG. 1.

Referring now to FIG. 3, a suitable electric power and control system is used for operating the air purifier 10 of the present invention off of conventional 120 volt power. A plug 56 may be connected to any suitable 120 power source and actuated through a switch 58 for providing power to the ultraviolet lamp 22 and to the transformer 50. The fan motor 18 may be operated from the transformer 50 through a switch 60 at a one predetermined speed. However, in the event that the air passing through the unit 10 is particularly dust laden it may be desirable to operate the fan 18 at a higher speed of operation. In that event, the full wave rectifier which is connected to the precipitator 20 will under heavy pollution conditions draw a higher load through the transformer 50 which will be reflected in a current transformer 62 coupled to the transformer 50 which will in turn operate a relay 64 to move the fan motor switch 60 to a second position 66 for higher speed operation. In addition, grounding screws 70 may be provided connected to a ground of the electrical plug 56 and physically connected to each of the charcoal filters 52 in FIG. 2 to ground the filters 52 so as to collect and provide a conductive path for each of the ions filtered by the filters 52 to ground.

Figure 4:
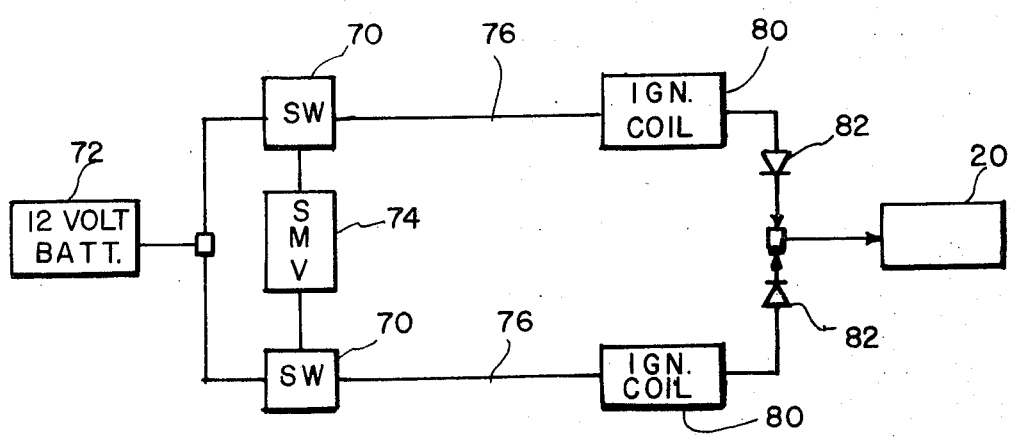
FIG. 4 is an electrical schematic of a power system for operating the precipitator from a vehicle battery.

As has been previously mentioned, the apparatus 10 of the present invention may be powered from batteries, for example only, from the battery of a vehicle such as an automobile. In that event a power source for providing the high voltage to the electrostatic precipitator plates may be provided as best seen in FIG. 4. One or more switches such as transistors 70 may be provided connected to a 12 volt dc battery 72. The switches 70 are periodically turned on and off by suitable means such as a free running astable multivibrator 74 to provide dc voltage pulses at the outputs 76 of the switches 70. Suitable electrical coils 80, such as ignition coils, may be provided to step up the dc voltage pulses from the lines 76 through suitable diodes 82 to provide a suitable pulsating current high voltage to the precipitator 20. The circuit of FIG. 4 will suitably provide a 6,000 volt alternating current of a frequency of approximately 100 hertz. In the event that a lower frequency range is satisfactory, one of the sides of the circuit of FIG. 4 may be omitted such by omitting one of the switches 70 and its connecting coil 80 and diode 82.

The present invention, therefore, is well adapted to obtain the ends and advantages mentioned as well as others inherent therein. While a presently preferred embodiment of the invention is given for the purpose of disclosure, numerous changes in the details of construction and arrangement of parts may be made which are within the spirit of the invention and the scope of the appended claims.

What is claimed is:

1. An air purifier comprising, a housing having an inlet for receiving air and an outlet for discharging air, an electrostatic precipitator in the housing in the path of air flow from the inlet to the outlet for removing particles from the air, an ultraviolet light in the housing for treating the air passing through the housing, an ozone removing filter in the housing in the path of air flow downstream from the precipitator; wherein the precipitator includes a helical wound wire forming loops, and an electrical power source connected in parallel to a plurality of the loops.

2. The apparatus of claim 1 wherein the precipitator includes, a support supporting the helical wound wire including an air baffle coaxially positioned in the helix, and an electrical conductor carried by the support and in electrical contact with each of the loops.

3. The apparatus of claim 2 wherein the air path through the precipitator includes a serpentine passageway with a turn around said air baffle.

4. The apparatus of claim 1 wherein the ozone removing filter is grounded.

5. An air purifier comprising, a housing having an inlet for receiving air and an outlet for discharging air, an electrostatic precipitator in the housing in the path of air flow from the inlet to the outlet for removing particles from the air, an ultraviolet light in the housing for treating the air passing through the housing, and an ozone removing filter in the housing in the path of air flow downstream from the precipitator; also including a power source connected to the electrostatic precipitator comprising, switching means adapted to be connected to a battery, a multivibrator connected to and actuating the switching means, coil means connected to the output of the switching means for stepping up the pulsating current from the switching means, and the output from the coil means connected to the electrostatic precipitator.

6. An air purifier comprising,
a housing having an inlet for receiving air and an outlet for discharging air,
a fan in the housing for moving air between the inlet and the outlet,
an electrostatic precipitator in the housing in the path of air flow between the inlet and the outlet for removing particles from the air, said precipitator including an electrical element having a helical wound wire forming loops,
an ultraviolet light in the housing for treating the air passing through the housing, and
an activated charcoal filter in the housing in the path of air flow downstream from the precipitator.

7. The apparatus of claim 6 wherein an electrical power source is conductive buss connected directly in parallel to a plurality of the wire loops.

8. The apparatus of claim 6 including a power source connected to the electrostatic precipitator comprising, switching means adapted to be connected to a battery, a free running multivibrator connected to switching means for stepped pulsating direct current voltage output from the switching means and stepped up pulsating direct current output from the electrical coil means connected to the precipitator.

* * * * *